Sept. 3, 1940.  H. BARTELS ET AL  2,213,541
VIBRATOR DEVICE
Filed Sept. 29, 1939
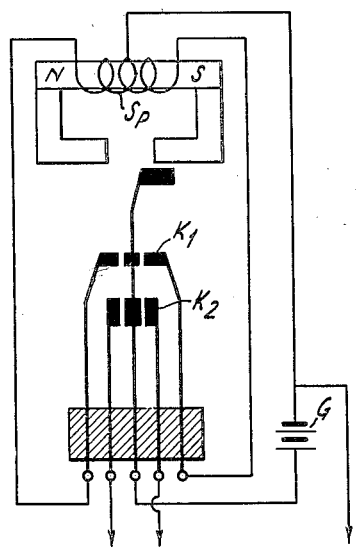
INVENTOR.
HANS BARTELS AND EDWIN SEVERIN
BY
ATTORNEY.

Patented Sept. 3, 1940

2,213,541

UNITED STATES PATENT OFFICE 2,213,541

VIBRATOR DEVICE

Hans Bartels and Edwin Severin, Berlin, Germany, assignors to Telefunken Gesellschaft für Drahtlose Telegraphie m. b. H., Berlin, Germany, a corporation of Germany Application September 29, 1939, Serial No. 297,080
In Germany September 23, 1938

3 Claims. (Cl. 175—373)

For the purpose of maintaining the vibrations of a chopper an exciting system must be provided. The energy required for the latter is generally supplied from the same battery which is used to supply the chopped direct current. In other words, the efficiency of a chopper is a function of the size of the said exciter power apart from other factors. In the case of many apparatus, more particularly portable ones, however, efficiency of operation plays a decisive part. General development therefore is to so raise the efficiency, that is to say, to reduce among other things the exciting energy. The excitation of these vibratory choppers comprising an oscillable member or vibrator as a general rule requires an electromagnet, and the current thereof is subject to direct control action by the chopper. Now, for a given magnetic exciter energy required for the maintenance of the oscillations, the exciting current will be so much smaller, the higher the efficiency of the electromagnet. For reasons of space and weight, the magnet cannot be built very large; hence, any attempt to enhance the efficiency would lie in the direction of improving the construction, for unchanged size or volume.

According to the present invention an attempt is therefore made to raise the magnetic force by superposing a direct current flux from a permanent magnet upon the exciting electromagnet. It will be noticed that the size of the magnetic attraction is a function of the square of the magnetic flux between the moving parts. The shift of the vibrator spring in the chopper due to the superposed flux can be reduced by suitable adjustment of the spring.

In choppers known in the art in which a freely moving keeper rather than a spring vibrator is used, recourse has been had to polarization in another manner and for different purposes. In the schemes disclosed in the earlier art it is the keeper rather than the core of the exciter coil that consists of a permanent magnet or is energized by a distinct winding or the exciting winding. For where a freely moving keeper is concerned it is only in this manner that reciprocating movement is obtained by an exciting alternating current.

When using an exciting circuit which, upon a complete amplitude of oscillation of the spring receives two exciting impulses rather than one (for instance, by the use of two pairs of exciter contacts), it is possible alternately to cut in either of two coils, if two distinct coils are used upon the exciting magnet, in such a way that during one half amplitude of the spring the magnetic flux is reinforced and during the other half amplitude there occurs a reduction to the same extent by the current flowing in the contrary direction. In this connection, the two circuits need not to satisfy the particular conditions which are necessary for the mechanical build-up swing of the chopper spring, in fact, it suffices if for this purpose essentially one pair of exciting contacts is correspondingly dimensioned. This is important for the reason that, for instance, in connection with the use of the working contacts for the control of the exciting circuits only one pair of contacts in quiescent state may make the circuit.

The appended drawing illustrates an exemplified embodiment of the invention as applied to the case before referred to where two energizing coils are employed (or else a single center-tapped coil). The permanent magnet in this embodiment has here, for instance, been mounted inside the exciter coil, though it could also be disposed at some other point of the magnetic path or circuit. The direct current source of supply G excites the exciter coil $S_p$ by way of contacts $K_1$, while the contacts $K_2$ serve to generate the chopped direct current, the latter being finally changed into alternating current in a transformer.

We claim:

1. In a device for transforming direct current energy into alternating current energy, a reed supported at one end and arranged to be vibrated between two extreme positions, a keeper attached to the reed near the free end thereof, a permanent magnet mounted in the vicinity of the keeper and arranged to exert a magnetic force thereon, a contact on said reed, a first stationary contact cooperating with the reed contact when the reed is in the vicinity of one of its extreme positions, a second stationary contact cooperating with the reed contact when the reed is in the vicinity of the other of its extreme positions, a driving coil for said reed connected between said two stationary contacts, a pair of terminals adapted to be connected to a source of direct current, one of said terminals being connected to said reed contact and the other thereof to an intermediate point of the driving coil.

2. The arrangement described in claim 1 characterized by that the driving coil is wound around the permanent magnet.

3. The arrangement described in claim 1 characterized by that the two portions of the driving coil are so arranged that during at least a part of one-half of a complete cycle of the operation of the reed the magnetic flux of the permanent magnet is reenforced whereas during at least a part of the other half it is diminished.

HANS BARTELS.
EDWIN SEVERIN.